US007154883B2

(12) United States Patent
Hirayama et al.

(10) Patent No.: US 7,154,883 B2
(45) Date of Patent: Dec. 26, 2006

(54) INTERNET TELEPHONE SYSTEM

(75) Inventors: Makoto Hirayama, Yokohama (JP); Kazuhiro Kita, Yokohama (JP); Tomohide Sugimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 10/137,448

(22) Filed: May 3, 2002

(65) Prior Publication Data

US 2003/0123434 A1 Jul. 3, 2003

(30) Foreign Application Priority Data

Dec. 28, 2001 (JP) .............................. 2001-399471

(51) Int. Cl.
*H04L 12/66* (2006.01)
(52) U.S. Cl. ..................... 370/356; 370/392; 370/401
(58) Field of Classification Search ..................... None
See application file for complete search history.

(56) References Cited

U.S. PATENT DOCUMENTS

| 6,335,927 | B1 * | 1/2002 | Elliott et al. ............... 370/352 |
| 6,600,735 | B1 * | 7/2003 | Iwama et al. ............... 370/352 |
| 6,829,232 | B1 * | 12/2004 | Takeda et al. ............. 370/401 |
| 6,829,243 | B1 * | 12/2004 | Sundhar ..................... 370/401 |
| 6,839,323 | B1 * | 1/2005 | Foti ........................... 370/392 |
| 6,888,803 | B1 * | 5/2005 | Gentry et al. ............... 370/401 |
| 6,961,857 | B1 * | 11/2005 | Floryanzia ................... 713/168 |
| 6,965,562 | B1 * | 11/2005 | Tuomi ......................... 370/352 |
| 7,002,919 | B1 * | 2/2006 | El-Sayed .................... 370/252 |
| 7,068,668 | B1 * | 6/2006 | Feuer .......................... 370/401 |
| 2002/0101860 | A1 * | 8/2002 | Thornton et al. ........... 370/401 |
| 2003/0031165 | A1 * | 2/2003 | O'Brien ..................... 370/401 |
| 2006/0077962 | A1 * | 4/2006 | Wu et al. .................... 370/352 |

FOREIGN PATENT DOCUMENTS

EP 0952742 A2 10/1999

* cited by examiner

*Primary Examiner*—Doris H. To
*Assistant Examiner*—Phuongchau Ba Nguyen
(74) *Attorney, Agent, or Firm*—Mattingly, Stanger, Malur & Brundidge, P.C.

(57) ABSTRACT

In executing a setup procedure of a call from a VoIP gateway on the originating side to a media gateway on the destination side via a gate keeper, an authentication key is transmitted from the gate keeper to the VoIP gateway and the media gateway. The VoIP gateway on the originating side transmits to the media gateway on the destination side an admissions confirm (ACF) after attaching the authentication key. Then, the media gateway collates the authentication key obtained from the originator VoIP gateway with the authentication key obtained from the gate keeper and continues the call setup procedure only when the two authentication keys coincide with each other. On the other hand, in case of non-coincidence, the gate keeper carries out a call release. Through this, an illegal connection call not routing through the gate keeper is excluded without fail.

9 Claims, 8 Drawing Sheets

```
AdmissionConfirm : : = SEQUENCE -- (ACF)
{
        requestSeqNum
        bandWidth
        callModel
        destCallSignalAddress
        irrFrequency
        nonStandardData
        ...,
        destinationInfo
        destExtraCallInfo
        destinationType
        remoteExtensionAddress
        alternateEndpoints
        tokens
        cryptoTokens
        integrityCheckValue
        transportQOS
        willRespondToIRR
        uuiesRequested
        language
        alternateTransportAddresses
        useSpecifiedTransport
        circuitInfo
        usageSpec
        supportedProtocols
        serviceControl
        multipleCalls
        featureSet
        genericData              SET "AUTHENTICATION KEY"
}
```

FIG. 4

```
Setup-UUIE : : = SEQUENCE
{
            protocolIdentifier
            h245Address
            sourceAddress
            sourceInfo
            destinationAddress
            destCallSignalAddress
            destExtraCallInfo
            destExtraCRV
            activeMC
            conferenceID
            conferenceGoal
            {
                        create
                        join
                        invite
                        ...,
                        capability-negotiation
                        callIndependentSupplementaryService
            },
            callServices
            callType
            ...,
            sourceCallSignalAddress
            remoteExtensionAddress
            callIdentifier
            h245SecurityCapability
            tokens
            cryptoTokens
            fastStart
            mediaWaitForConnect
            canOverlapSend
            endpointIdentifier
            multipleCalls
            maintainConnection
            connectionParameters
            {
                        connectionType
                        numberOfScnConnections
                        connectionAggregation
                        ...
            } OPTIONAL,
            language
            presentationIndicator
            screeningIndicator
            serviceControl
            symmetricOperationRequired
            capacity
            circuitInfo
            desiredProtocols
            neededFeatures             SET "AUTHENTICATION KEY"
            desiredFeatures
            supportedFeatures
            parallelH245Control
            additionalSourceAddresses
}
```

INTERNET TELEPHONE SYSTEM

BACKGROUND OF THE INVENTION

The present invention relates to Internet telephone technologies and information processing techniques and more particularly to a technique effective to exclude illegal connection calls in an Internet telephone system.

In recent years, the Internet has been spread rapidly and it is recognized as information base in the community. From the viewpoint of reduction of costs of calling and a cost reduction attributable to unification of voice and data in individual enterprises, Internet telephone service is provided as the base of enterprise. An IP telephone in the Internet has been implemented with protocol such as H.323 and H.225RAS procedures. In originating a call from the IP (Internet Protocol) telephone in the Internet, authentication of the calling terminal and conversion of a destination telephone number into an IP address of a destination media gateway (address resolution) are carried out by means of a gate keeper and thereafter a call setup signal is transmitted from a VoIP (Voice over IP) gateway accommodating the IP telephone to the media gateway, thus achieving a call setup.

SUMMARY OF THE INVENTION

In the prior art as above, however, when a VoIP gateway without the function of communicating with the gate keeper has the ability to realize the address resolution from the destination telephone number to the destination media gateway, the VoIP gateway is permitted to directly set up a call to the destination media gateway without routing through the authentication in the gate keeper. Especially when tolling information in the gate keeper is collected, there arises a problem that a charge-free call setup can be permitted.

An object of the present invention is to exclude an unauthorized access (illegal connection call) in the Internet telephone system.

According to the invention, there is provided a contrivance in which in an Internet telephone system for performing a call setup process through a gate keeper, any call setup not routing through the gate keeper is excluded in a gateway to prevent communication lines from being used illegally.

More specifically, when the gate keeper receives an admissions request from a VoIP gateway during a call from an IP telephone, it creates an authentication key in an authentication/address resolution process. Then, the gate keeper attaches the thus created authentication key to an admissions confirm transmitted to the VoIP gateway and a destination media gateway. On the other hand, the VoIP gateway extracts the authentication key from the received admissions confirm and transmits to the media gateway a call setup signal after attaching the authentication key to the signal. The media gateway compares the authentication key attached to the call setup signal with that attached to the admissions confirm received from the gate keeper and continues a call setup procedure only when the two authentication keys are identical to each other. On the other hand, in case the two are not identical to each other or the received call setup signal is not attached with the authentication key, the call setup procedure is interrupted.

The object of the present invention can be accomplished through a series of operations as above.

Other objects, features and advantages of the invention will become apparent from the following description of the embodiments of the invention taken in conjunction with the accompanying drawings.

DETAILED DESCRIPTION OF THE EMBODIMENTS

The invention will now be described in greater detail by way of example with reference to the accompanying drawings.

Figure 1:
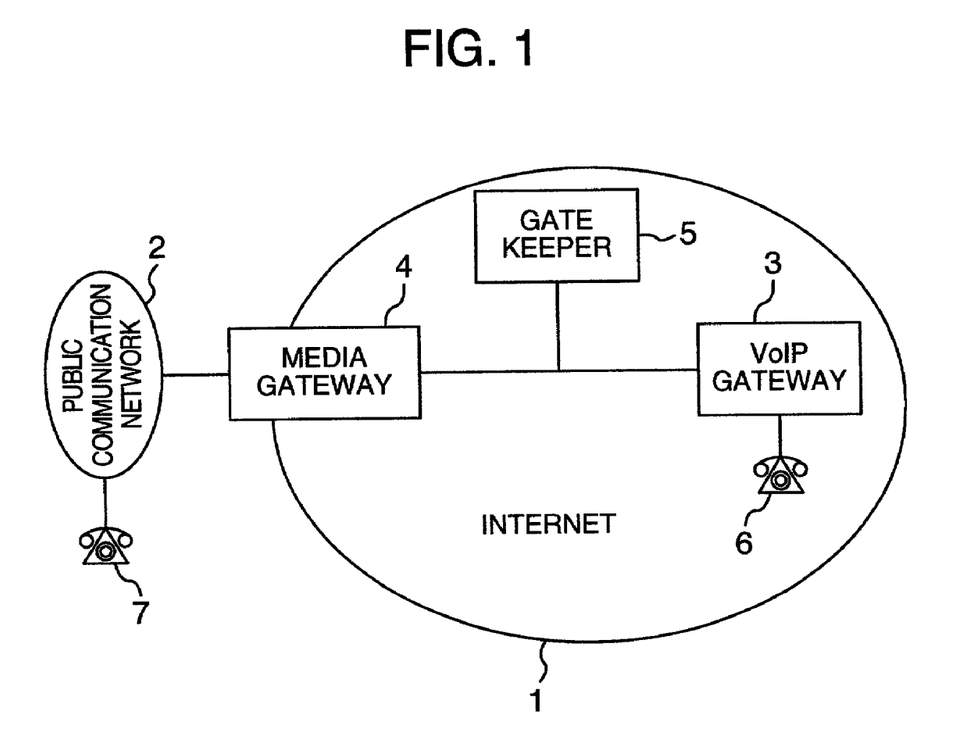
FIG. 1 is a diagram showing the construction of an Internet telephone system according to an embodiment of the invention.

FIG. 1 is a diagram showing the construction of an Internet telephone system according to an embodiment of the invention.

In case of the present embodiment, a VoIP gateway 3, a media gateway 4, a gate keeper 5 and an IP telephone 6 exist in an Internet 1.

In the case of a call from the IP telephone 6, when the IP telephone 6 originates the call, the VoIP gateway 3 accommodating the IP telephone 6 transmits an admission request (ARQ) to the gate keeper 5. Receiving the ARQ, the gate keeper 5 creates an authentication key and transmits to the VoIP gateway 3 an admissions confirm (ACF) after attaching the authentication key. The gate keeper 5 also transmits a similar ACF to the media gateway 4. The VoIP gateway 3 receiving the ACF from the gate keeper 5 transmits to the media gateway 4 a call setup signal after attaching the authentication key attached to the ACF.

At a point of time that the media gateway 4 receives both the ACF from the gate keeper 5 and the call setup signal from the VoIP gateway 3, it compares the two authentication keys (one contained in the ACF from the gate keeper 5 and the other contained in the call setup signal from the VoIP gateway 3). Then, if the two authentication keys are identical to each other, the media gateway 4 continues a call setup procedure.

Figure 3:
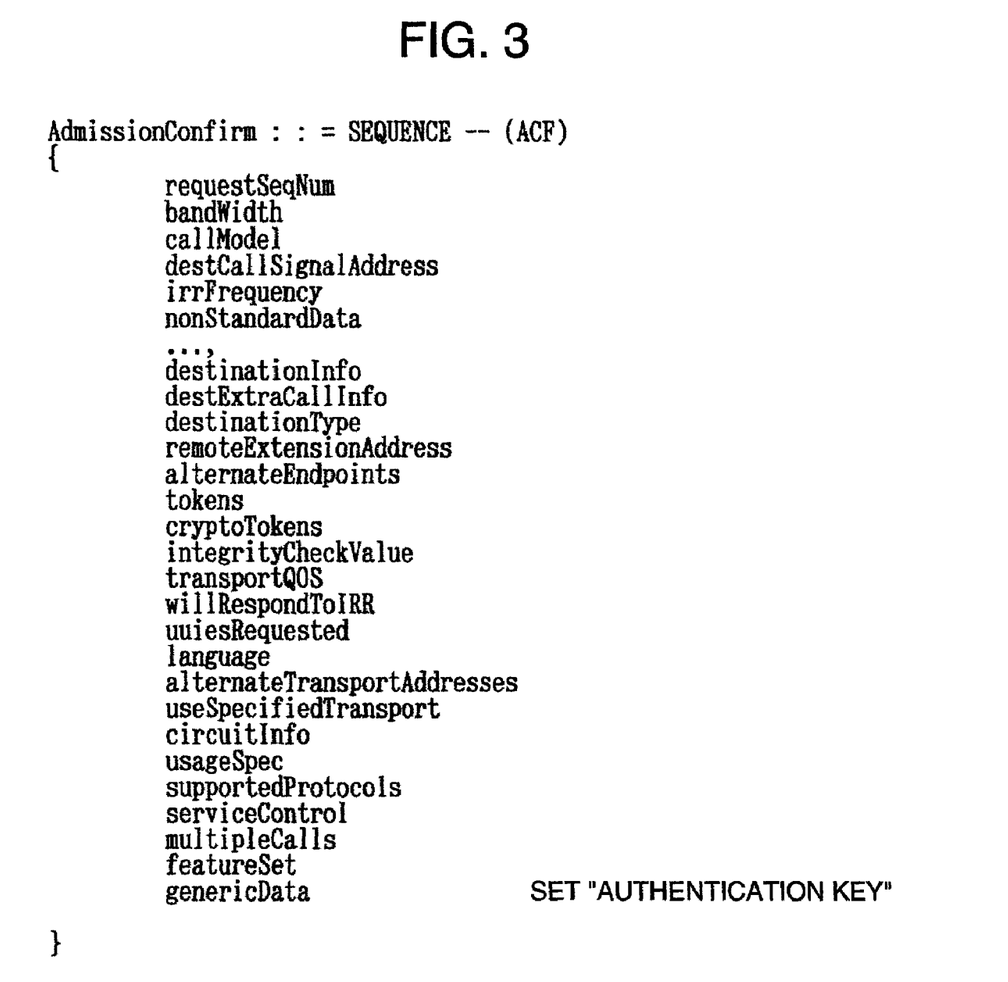
FIG. 3 is a format of an ACF message in the embodiment of the invention.

FIG. 3 shows an example of a format of the ACF message transmitted from the gate keeper 5 to the VoIP gateway 3 or the media gateway 4. The authentication key is set in a part "genericData" of the ACF.

Figure 4:
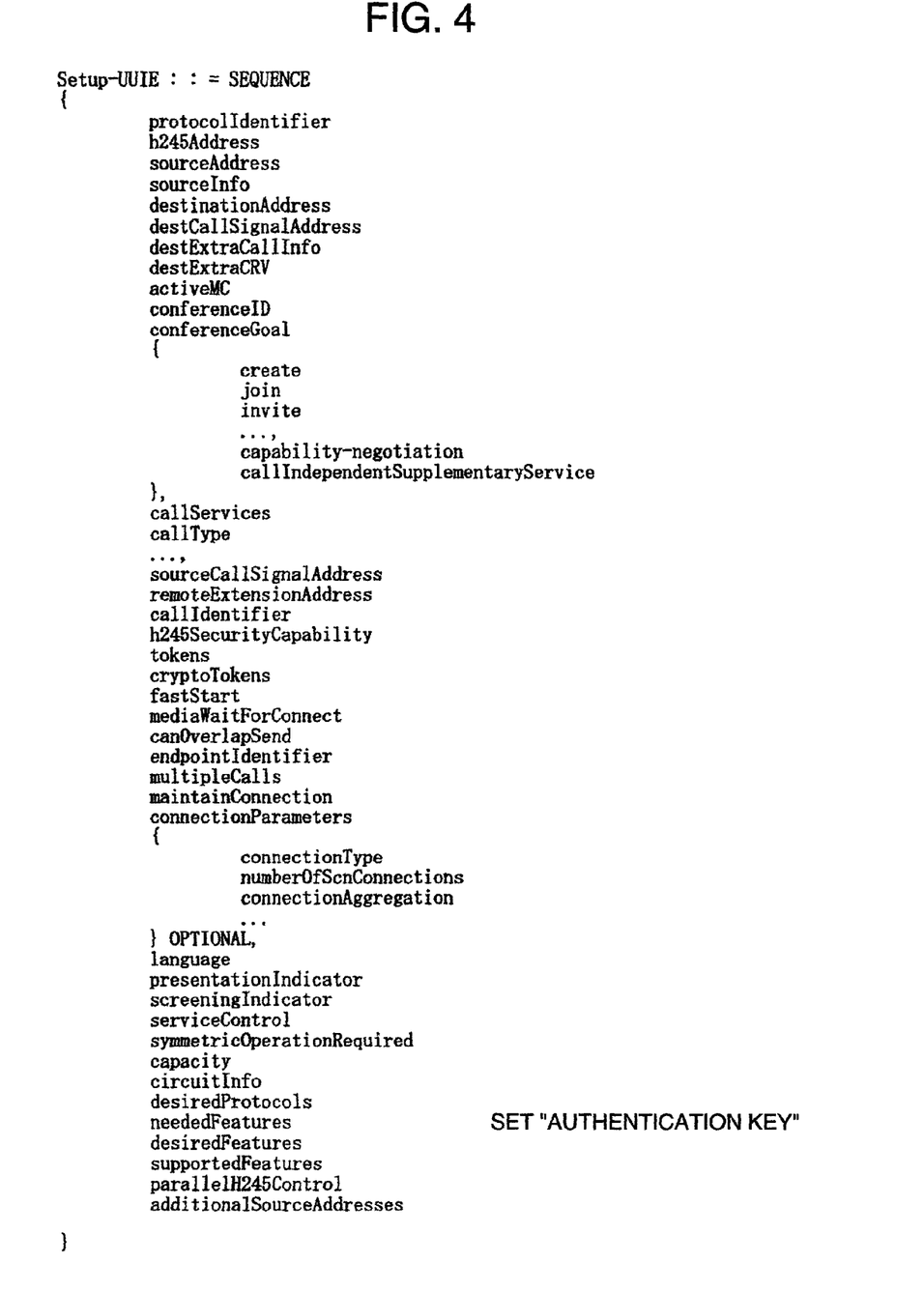
FIG. 4 is a format of a setup massage in the embodiment of the invention.

FIG. 4 shows an example of a format of the call setup signal message transmitted from the VoIP gateway 3 to the media gateway 4. The authentication key is set in a part "neededFeatures" of the call setup signal message.

Figure 5:
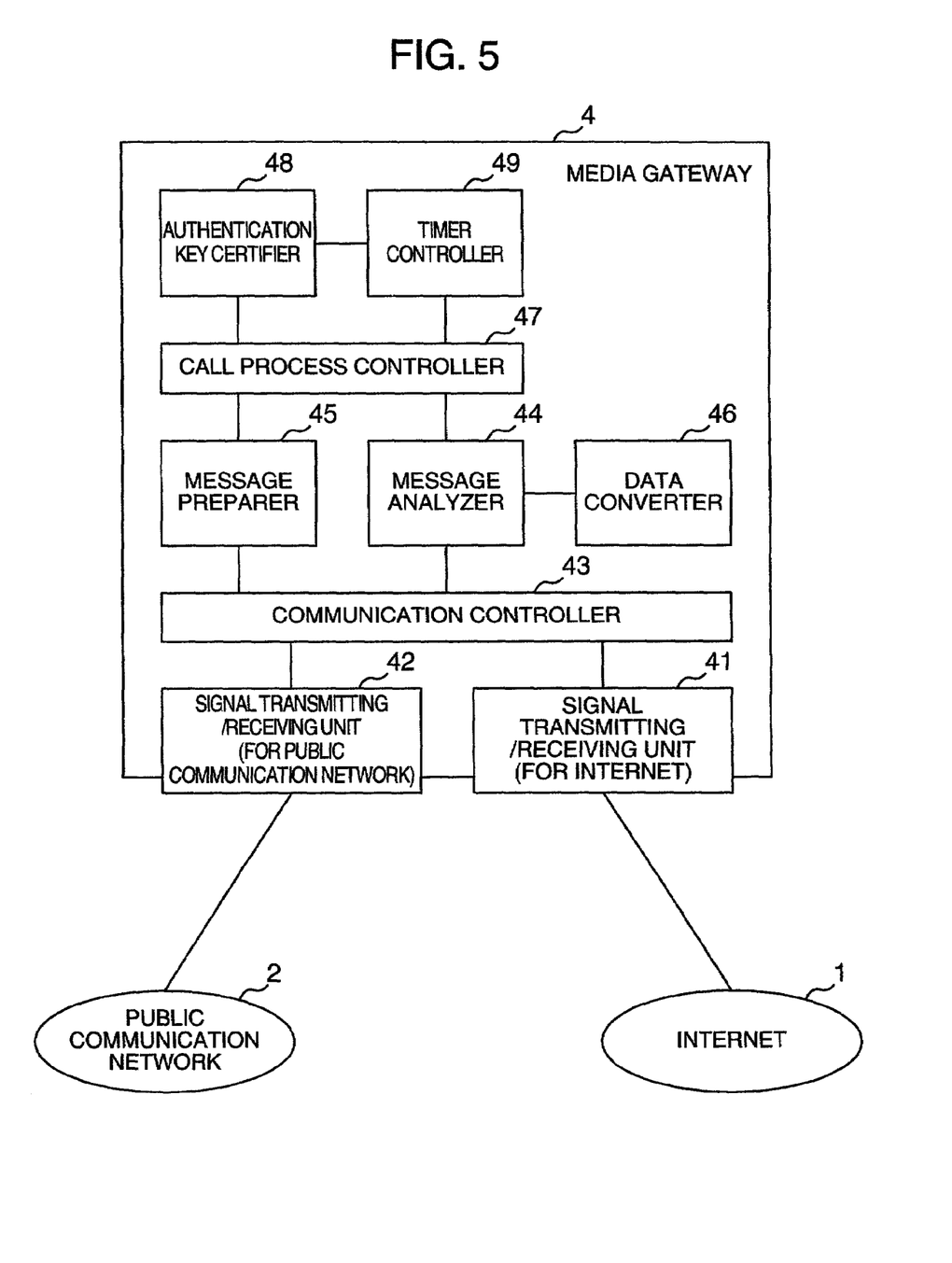
FIG. 5 is a block diagram showing an example of functional blocks of a media gateway in the Internet telephone system according to the embodiment of the invention.

FIG. 5 shows an example of a functional block diagram of the media gateway in the present embodiment. Signals from the Internet 1 and public communication network 2 received by a signal transmitting/receiving unit 41 or 42 are put together in a unit of message by means of a communication controller 43 so as to be subjected to analysis of messages by means of a message analyzer 44.

When the result of analysis in the message analyzer 44 indicates a message for call process control, a call process control operation is subsequently carried out with a call process controller 47. On the other hand, when the result of analysis in the message analyzer 44 indicates data end to end transmitted/received during calling, such as voice data, the data is converted into data for transmission destination network by means of a data converter 46 and then routed through the communication controller 43 so as to be transmitted from the corresponding signal transmitting/receiving unit 41 (or signal transmitting/receiving unit 42) to the Internet 1 (or public communication network 2).

In case of the received message being the ACF or the call setup signal, the call process controller 47 receiving the message for call process control extracts an authentication key from the received message. Then, the call process controller 47 transmits the extracted authentication key to an authentication key certifier 48. When receiving an authentication key for the first time, the authentication key certifier 48 holds the authentication key and causes a timer controller 49 to start a timer. Then, when the authentication key certifier 48 receives an authentication key for the second time before the time-out, it causes the timer controller 49 to stop the timer and thereafter compares the authentication key received firstly with the authentication key received secondly. If the result of comparison indicates coincidence between the authentication keys, the authentication key certifier 48 urges the call process controller 47 to continue the call setup process but if non-coincidence between the authentication keys is indicated, it commands the call process controller 47 to stop the call setup process. If, before receiving the authentication key for the second time, the authentication key certifier 48 receives from the timer controller 49 a notice of the time-out, it commands the call process controller 47 to stop the call setup process.

In response to the authentication result from the authentication key certifier 48 and the received message from the message analyzer 44, the call process controller 47 causes a message preparer 45 to prepare a suitable transmission message so that data routing though the communication controller 43 may be transmitted from the corresponding signal transmitting/receiving unit 41 (or signal transmitting/receiving unit 42) to the Internet 1 (or public communication network 2).

In case of a call from a general telephone 7, the call process controller 47 of media gateway 4 receives a message for call process control and if the received message is an admissions confirm (ACF), the call process controller 47 extracts an authentication key from the received message and causes the message preparer 45 to set the extracted authentication key in a counterpart of a call setup signal message to be transmitted next so that data routing through the communication controller 43 may be transmitted to the Internet 1 from the corresponding signal transmitting/receiving unit 41.

Figure 6:
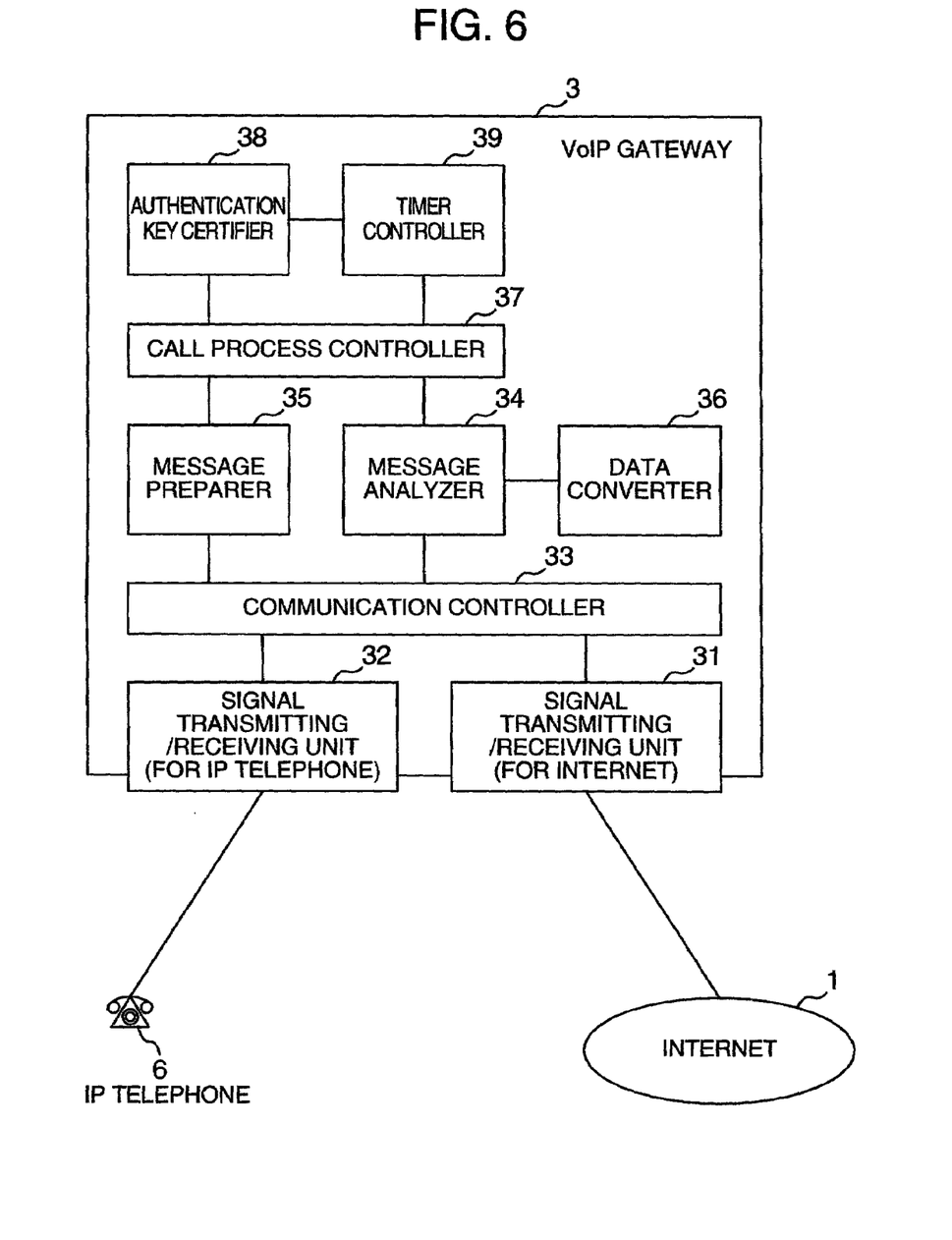
FIG. 6 is a block diagram showing an example of functional blocks of a VoIP gateway in the Internet telephone system according to the embodiment of the invention.

FIG. 6 shows an example of a functional block of the VoIP gateway 3 in the present embodiment. Signals from the Internet network 1 (or IP telephone 6) are received by a signal transmitting/receiving unit 31 (or signal transmitting/receiving unit 32) and they are put together in a unit of message by means of a communication controller 33 so as to be subjected to analysis of messages by means of a message analyzer 34.

Next, when the result of analysis in the message analyzer 34 indicates a message for call process control, a call process controller 37 carries out a call process control operation. On the other hand, when the result of analysis in the message analyzer 34 indicates data transmitted/received end-to-end during calling, such as voice data, the received data is converted into data for transmission destination network by means of a data converter 36 and then routed through the communication controller 33 so as to be transmitted to the Internet 1 (or IP telephone 6) from the corresponding signal transmitting/receiving unit 31 (or signal transmitting/receiving unit 32).

When the message for call process control received by the call process controller 37 is an admissions confirm (ACF), the call process controller 37 extracts an authentication key from the received message and causes a message preparer 35 to set the extracted authentication key in a counterpart of a call setup signal message to be transmitted next. Then, the message preparer 35 transmits data routing through the communication controller 33 to the Internet 1 from the corresponding signal transmitting/receiving unit 31.

In case of the VoIP gateway 3 (IP telephone 6) being on the destination side, the call process controller 37 receives a message for call process control and if the received massage is an ACF or a call setup signal, the call process controller 37 extracts an authentication key from the received message. Then, the call process controller 37 transmits the extracted authentication key to an authentication key certifier 38. At the time that the authentication key certifier 38 receives an authentication key for the first time, it holds the authentication key and causes a timer controller 39 to start a timer. When the authentication key certifier 38 receives an authentication key for the second time before the time-out, it causes the timer controller 39 to stop the timer and thereafter compares the authentication key received firstly with the authentication key received secondly. If the result of comparison indicates coincidence between the two authentication keys, the authentication key certifier 38 urges the call process controller 37 to continue a call setup process but in the case of non-coincidence, it commands the call process controller 37 to stop the call setup process. When, before receiving the authentication key for the second time, the authentication key certifier 38 receives from the timer controller 39 a notice of the time-out, it commands the call process controller 37 to stop the call setup process.

Figure 7:
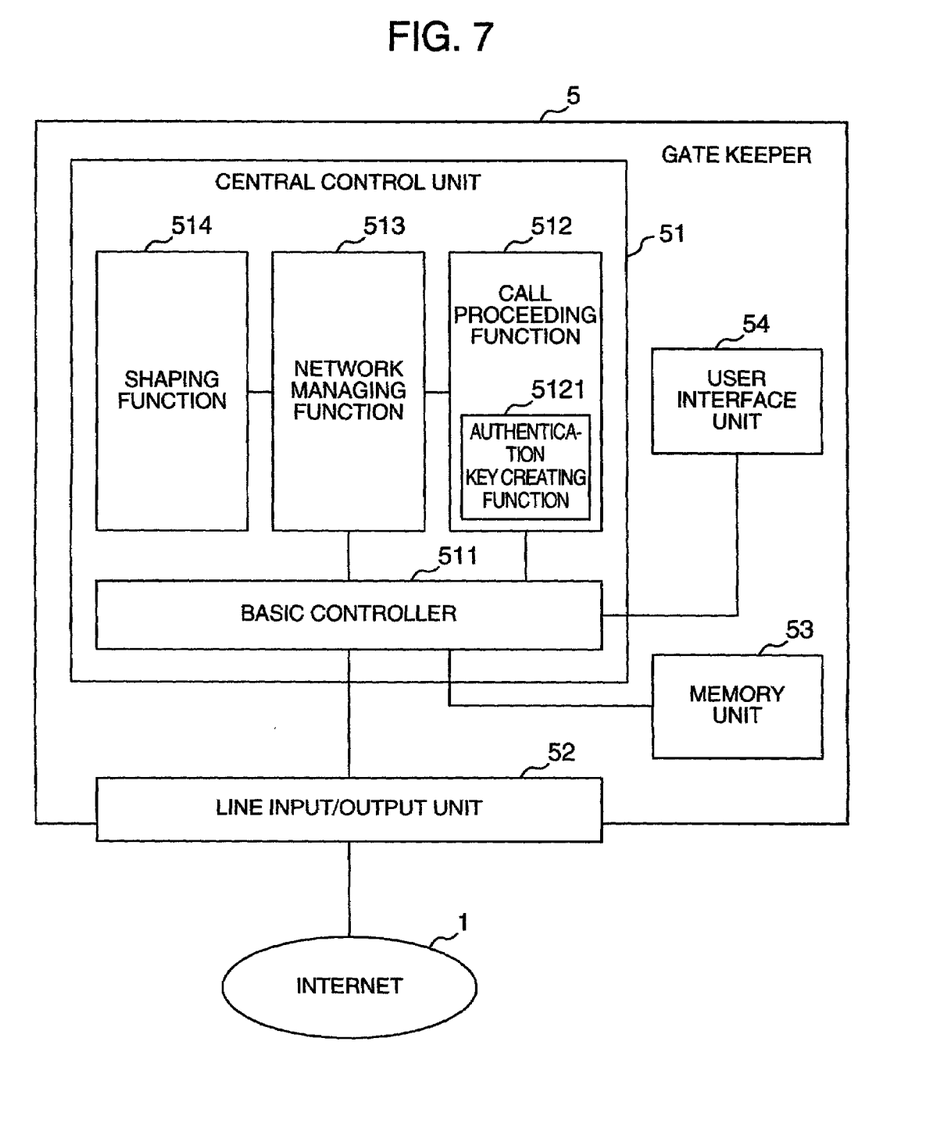
FIG. 7 is a block diagram showing an example of functional blocks of a gate keeper in the Internet telephone system according to the embodiment of the invention.

FIG. 7 shows an example of a functional block of the gate keeper 5 in the present embodiment. The gate keeper 5 is implemented by incorporating application software on a UNIX server or PC server and it includes, as main constituents, a line input/output unit 52, a central control unit 51, a memory unit 53 and a user interface unit 54. The central control unit 51 is comparable to a CPU on the server, having internal blocks that are functional blocks of software executable on the CPU.

A basic controller 511 is a component comparable to an operating system (OS), implementing an interface to individual components and besides taking charge of control of execution of applications designated at 512 to 514. Here, basic communication protocol necessary for communication through the Internet network 1, such as IP, UDP (User Datagram Protocol) and TCP (Transmission Control Protocol), is realized. The line input/output unit 52 is connected to the Internet 1 to perform communication and is implemented with a generally used LAN board. Here, the unit 52 carries out a process corresponding to a layer 2 in the LAN interface. The memory unit 53 is a memory device implemented with a magnetic disk or optical disk built in the server. The memory unit 53 is sometimes constructed by such an independent device as disk server depending on the scale of the network. Generally, the memory unit 53 has the existing fault tolerance function such as mirroring or duplexing to improve the reliability.

Like the ordinary server, the user interface unit 54 is comprised of a display, a keyboard and a mouse. The central control unit 51 has, as realizable applications, a shaping function 514, a network managing function 513 and a call proceeding function 512, for instance. The shaping function 514 realizes the management of the communication band between media gateway 4 and VoIP gateway 3. The network managing function 513 realizes a prescribed registration process of gateway such as ITU-TH323 standards and a function prescribed in standards of, for example, transmission/reception of attribute information of gateway between the present gate keeper and another gate keeper. The call proceeding function 512 receives an admission request (ARQ) from the VoIP gateway 3 or media gateway 4 to select a gateway on the destination side.

When an ARQ from the VoIP gateway 3 (or media gateway 4) on the calling or originating side is received, an authentication key creating function 5121 in the call proceeding function 512 creates an authentication key and transmits a signal after setting the created authentication key in a counterpart of an ACF. The authentication key is created by randomly setting a combination of alphabet and 0~9 numerals in number of letters corresponding to a length of a message set in the counterpart of the ACF.

Referring now to a flowchart of FIG. 2, an example of a call setup procedure in the present embodiment will be described.

When the IP telephone 6 originates a call, the VoIP gateway 3 accommodating the IP telephone 6 transmits an ARQ to the gate keeper 5 (step S01). Receiving the ARQ, the gate keeper 5 creates an authentication key (step S02). Next, the gate keeper transmits to both the VoIP gateway 3 and the media gateway 4 an ACF attached with the authentication key (steps S03 and S04). After receiving the ACF transmitted from the gate keeper 5, the VoIP gateway 3 attaches the attached authentication key to a call setup signal (step S05) and then transmits the call setup signal to the media gateway 4(step S07).

At a point of time that the media gateway 4 receives the ACF from the gate keeper 5 or the call setup signal from the VoIP gateway 3, it starts the timer (step S06). The user can change the setting time of the timer. If an ACF or call setup signal that has not been received yet is received before the time-out, the media gateway 4 compares the authentication key in the ACF from the gate keeper 5 with the authentication key in the call setup signal from the VoIP gateway 3 at a time point that both the signals are received (step S08). If the authentication keys are identical to each other, the media gateway 4 continues the call setup procedure (step S10).

On the other hand, when the authentication keys do not coincide with each other, a call release signal is transmitted to the originator (step S09).

As described above, according to the present embodiment, an illegal connection call about to make a call setup without routing through the gate keeper 5 can be excluded and for example, a line resource of public communication network 2 such as general public telephone network can be prevented from being used illegally.

Figure 8:
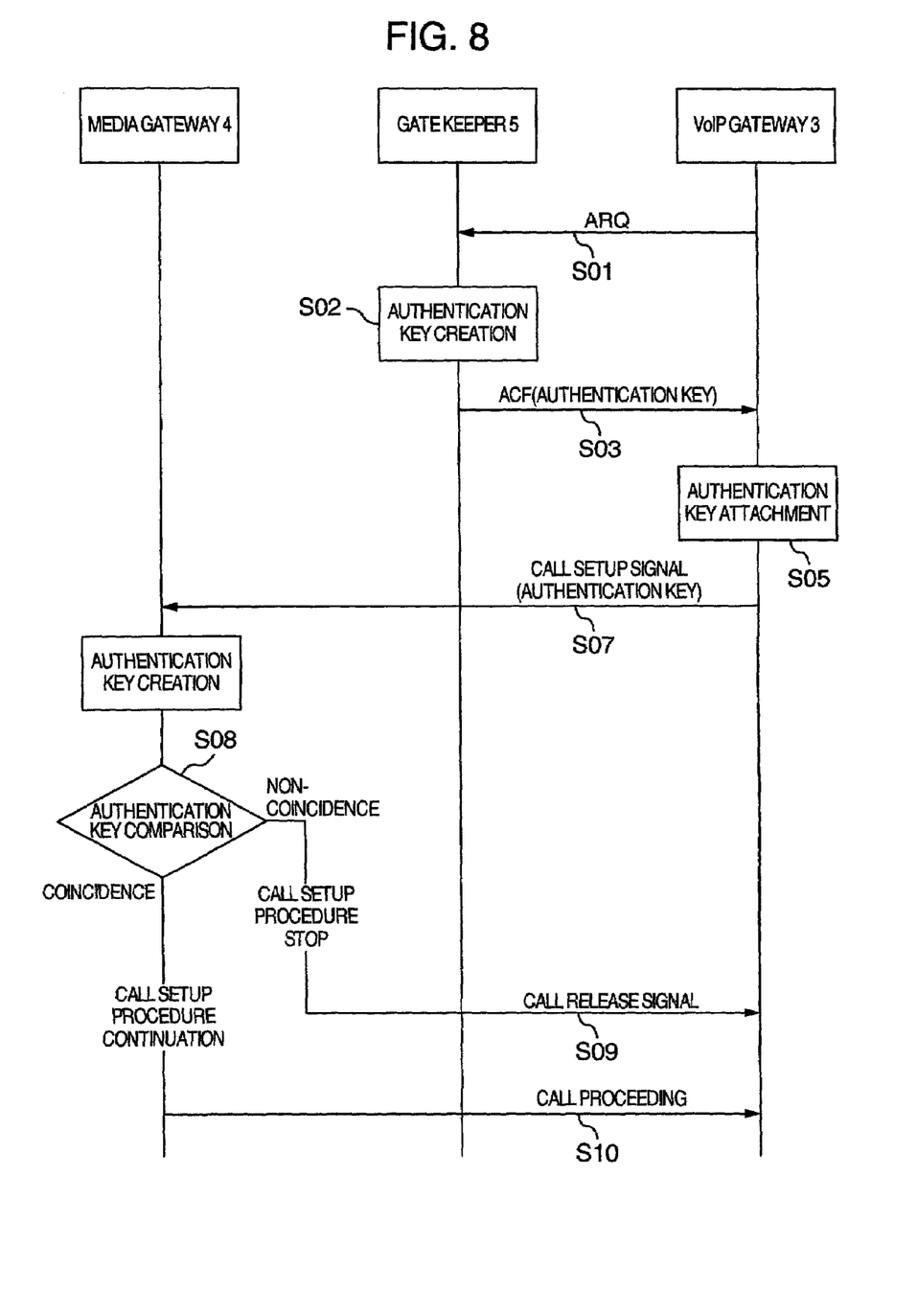
FIG. 8 is a flowchart showing a modified example of the call setup procedure for excluding the illegal connection call in the Internet telephone system according to the embodiment of the invention.

FIG. 8 is a flowchart showing a modified example of the call setup procedure in the present embodiment.

Figure 2:
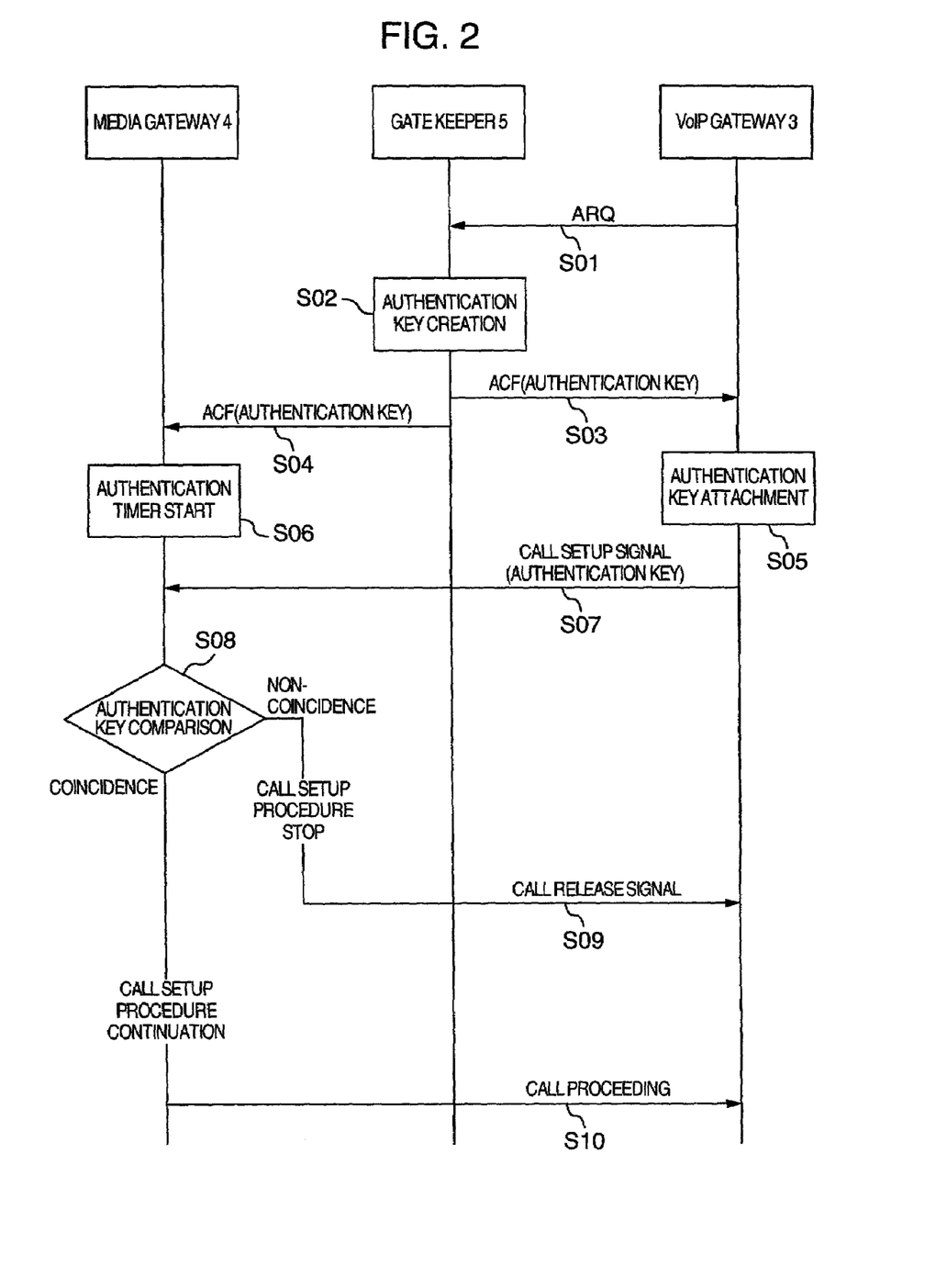
FIG. 2 is a flowchart showing an example of a call setup procedure for excluding illegal connection calls in the Internet telephone system according to the embodiment of the invention.

The example of FIG. 8 differs from the afore-mentioned FIG. 2 example in that in the call setup procedure, the gate keeper 5 transmits an ACF containing an authentication key to only the VoIP gateway 3 on the originating side and the media gateway 4 on the receiving side creates an authentication key by using the same creation algorithm as that in the gate keeper 5, collates the authentication key created in the unit of its own with the authentication key contained in a call setup signal from the VoIP gateway 3 and carries out an authentication process in step S08 by deciding coincidence/non-coincidence of the collation result.

In this case, there needs no process for transmission of an authentication key from the gate keeper 5 to the media gateway 4 on the receiving side, thus attaining an advantage that the load on the gate keeper 5 and Internet 1 can be alleviated and an illegal connection call can be excluded to thereby improve the security.

The invention has been described specifically by way of embodiments but the invention is in no way limited to the foregoing embodiments and can of course be changed in various ways without departing from the gist of the invention.

The invention claimed is:

1. A call setup procedure method in an Internet telephone system having an IP telephone, a VoIP gateway accommodating said IP telephone, a gate keeper for performing address resolution and a media gateway on the destination side, wherein said VoIP gateway responds to a call originated from said IP telephone to transmit an admission request (ARQ) to said gate keeper, wherein said gate keeper responds to reception of said admission request to transmit to said VoIP gateway and said media gateway an admissions confirm (ACF) after attaching an authentication key created by said gate keeper, wherein said VoIP gateway extracts the authentication key from said transmitted admissions confirm and transmits to said media gateway a call setup signal after attaching the extracted authentication key, and wherein said media gateway decides whether the authentication key attached to the admissions confirm received from said gate keeper coincides with the authentication key attached to the call setup signal of said VoIP gateway.

2. A call setup procedure method in an Internet telephone system according to claim 1, wherein a call setup procedure continues in compliance with coincidence between the two authentication keys in the decision.

3. A call setup procedure method in an Internet telephone system according to claim 1, wherein a call setup procedure is stopped in compliance with non-coincidence between the two authentication keys in the decision.

4. A call setup procedure method in an Internet telephone system according to claim 3, wherein a call release signal is transmitted to said VoIP gateway in the course of a stoppage of said call setup procedure.

5. A call setup procedure method in an Internet telephone system having an IP telephone, a VoIP gateway accommodating said IP telephone, a gate keeper for performing address resolution and a media gateway on the destination side, wherein said VoIP gateway responds to a call originated from said IP telephone to transmit an admission request (ARQ) to said gate keeper, wherein said gate keeper responds to reception of said admission request to transmit to said VoIP gateway an admissions confirm (ACE) after attaching an authentication key created by said gate keeper, wherein said VoIP gateway extracts the authentication from said transmitted admission confirm and transmits to said media gateway a call setup signal after attaching the extracted authentication key, and wherein said media gateway decides whether an authentication key created pursuant to the same algorithm as that in said gate keeper coincides with the authentication key attached to said admissions confirm received from said gate keeper.

6. A call setup procedure method in an Internet telephone system according to claim 5, wherein a call setup procedure continues in compliance with coincidence between the two authentication keys in the decision.

7. A call setup procedure method in an Internet telephone system according to claim 5, wherein a call setup procedure is stopped in compliance with non-coincidence between the two authentication keys in the decision.

8. A call setup procedure method in an Internet telephone system according to claim 7, wherein a call release signal is transmitted to said VoIP gateway in the course of a stoppage of said call setup procedure.

9. An Internet telephone system comprising:

an IP telephone;

a VoIP gateway accommodating said IP telephone and being responsive to a call originated from said IP telephone to transmit an admission reguest (ARQ);

a gate keeper responsive to said transmitted admission reguest to transmit to said VoIP gateway and a media gateway on the destination side an admissions confirm after attaching an authentication key created by gate keeper, wherein said VoIP gateway transmits to said media gateway a call setup signal after attaching the authentication key attached to the received admissions confirm, and wherein said media gateway on the destination side decides whether the authentication key attached to the admissions confirm received from said gate keeper coincides with the authentication key attached to the call setup signal of said VoIP gateway and continues a call setup procedure in compliance with coincidence between the two authentication keys.

* * * * *